Figure 1:
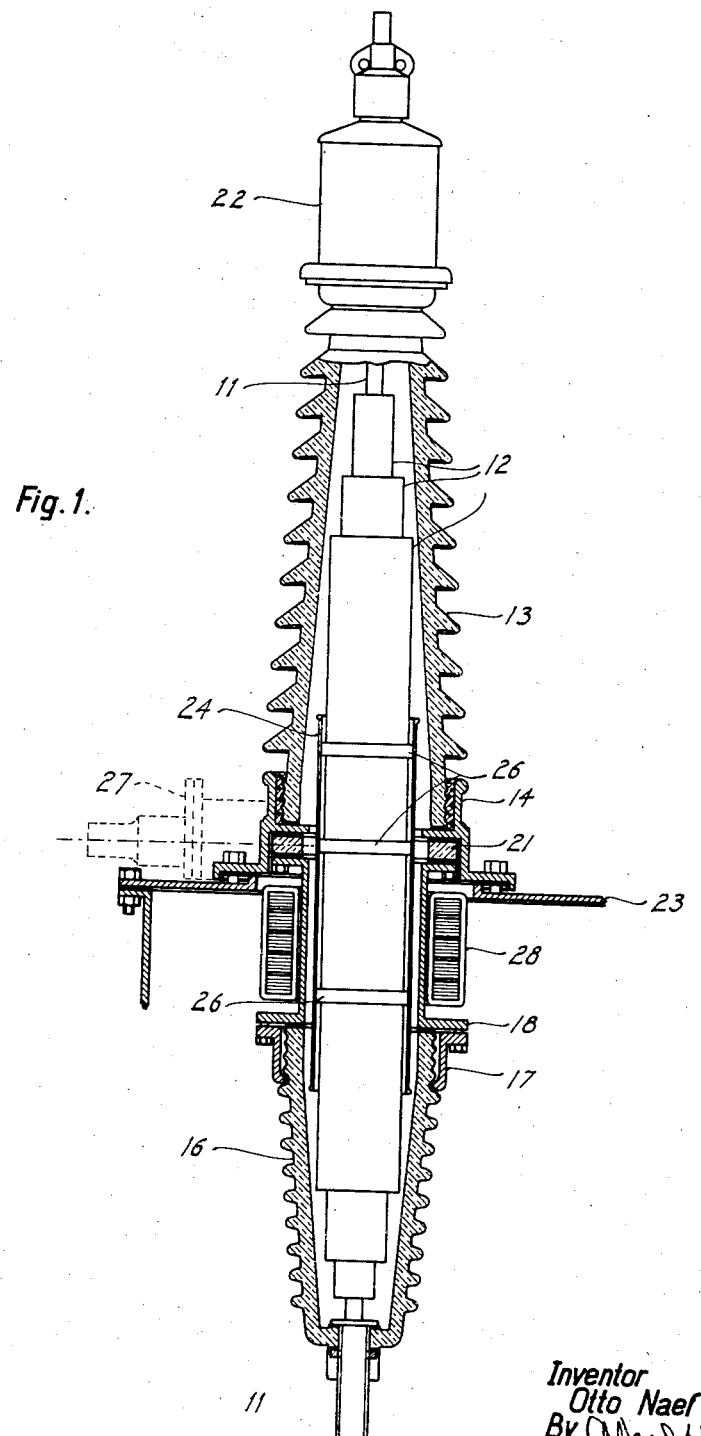

Aug. 30, 1932.  O. NAEF  1,873,977
CONDENSER BUSHING
Filed May 26, 1931    4 Sheets-Sheet 2

Inventor
Otto Naef
By Alfred H. Dyson
Attorney

Aug. 30, 1932.                O. NAEF                1,873,977
                          CONDENSER BUSHING
                          Filed May 26, 1931        4 Sheets-Sheet 3

Inventor
Otto Naef
By Alfred H. Dyson
                Attorney

Aug. 30, 1932.　　　　　O. NAEF　　　　　1,873,977
CONDENSER BUSHING
Filed May 26, 1931　　　4 Sheets-Sheet 4

Inventor
Otto Naef
By
Attorney

Patented Aug. 30, 1932

1,873,977

UNITED STATES PATENT OFFICE

OTTO NAEF, OF HADDONFIELD, NEW JERSEY, ASSIGNOR, BY MESNE ASSIGNMENTS, TO ALLIS-CHALMERS MANUFACTURING COMPANY, OF MILWAUKEE, WISCONSIN, A CORPORATION OF DELAWARE

CONDENSER BUSHING

Application filed May 26, 1931. Serial No. 540,109.

This invention relates to improvements in electrical apparatus for high voltages and particularly to insulating bushings for high voltage conductors from which relatively small amounts of energy are to be taken.

The use of small amounts of energy for measuring, relay operation, synchronizing and other purposes is frequently required in the vicinity of and is to be taken from high tension electric lines. To use the high tension line itself as a source of power however requires voltage and current transformers which must be heavily insulated for the high voltages encountered and therefore become large in size and expensive to construct. If the insulating bushings of a high voltage circuit breaker, transformer or other apparatus are available; current transformers may be installed directly in the bushing structure and the electrostatic capacity of the bushing may be used as a source of potential. The insulation of the bushing itself need be but slightly increased to secure adequate insulation of the current and potential sources. In such bushings, however, the electrostatic capacity must generally be increased to secure operation of relays or synchronizing means and other electrically operated devices. The insertion of a condenser plate provided with a terminal will permit the abstraction of sufficient energy for the operation of voltage responsive devices or meters and a current transformer combined with the bushing provides an adequate source of current for the operation of current responsive devices or meters.

It is, therefore, among the objects of the present invention to provide an oil-filled bushing for high tension conductors which may be used as a source of energy from which such amounts as are suitable for metering, synchronizing, relay operation or the like may be taken.

Another object of the invention is to provide an oil-filled bushing for high tension conductors in which the bushing permits the arrangement of one or more magnetic cores with windings thereon which serve as current transformers for the current flowing in the high tension conductor extending through the bushing or as step-down transformers for the tap voltage, or serve both purposes in a single structure, the electrostatic capacity of the bushing being used as a source of current and voltage for the transformers.

Another object of the invention is to provide an oil-filled bushing for high tension conductors in which the conductors to the condenser layer arranged thereon are so located and arranged as to avoid leakage paths exposed to the atmosphere.

Another object of the invention is to provide an oil-filled bushing for high tension conductors having a condenser layer for the abstraction of small amounts of power and a transformer element arranged coaxially with the high tension conductor extending through the bushing with the primary winding of the transformer connected to the condenser layer, in which the primary winding and the connections thereto are located entirely within the oil filled space of the bushing.

Another object of the invention is to provide an oil-filled bushing for high tension conductors which bushing is provided with means for abstracting current therefrom so arranged as to be readily accessible without dismantling of the bushing.

Another object of the invention is to provide an oil-filled bushing for high tension conductors which bushing is so constructed as to provide a source for small quantities of current and voltage with the use of the component portions of commercial designs for high voltage bushings now known.

Another object of the invention is to provide an oil-filled bushing for high voltage conductors in which the bushing is so constructed as to provide a source for small quantities of current and voltage with such arrangement of the conductors therefrom as to prevent contact of the conductors with hot oil or gases.

Figure 2:
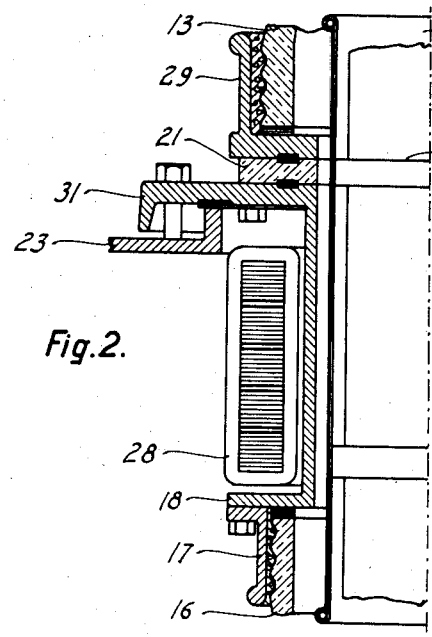
Figure 3:
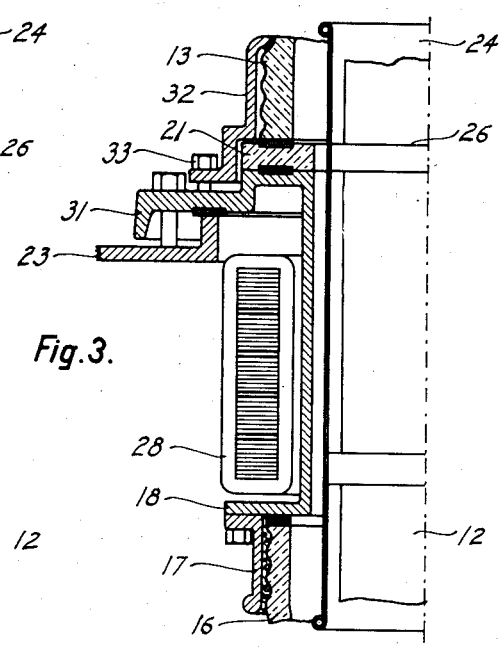
Figure 5:
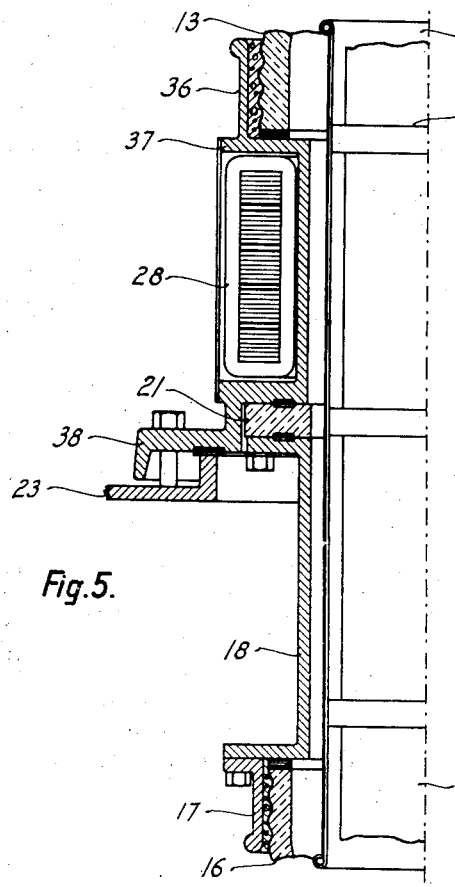
Figure 4:
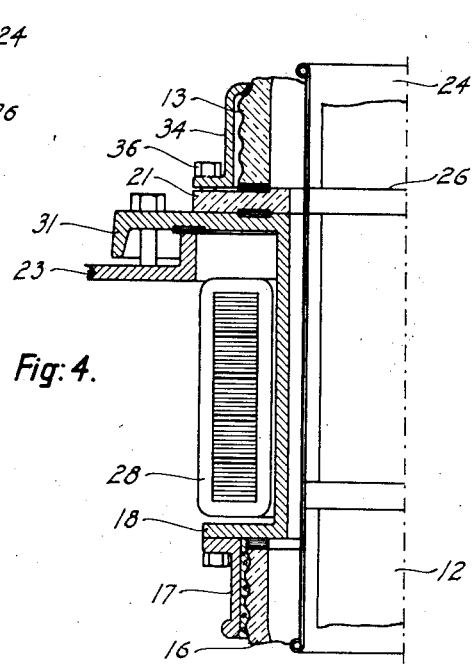
Figure 6:
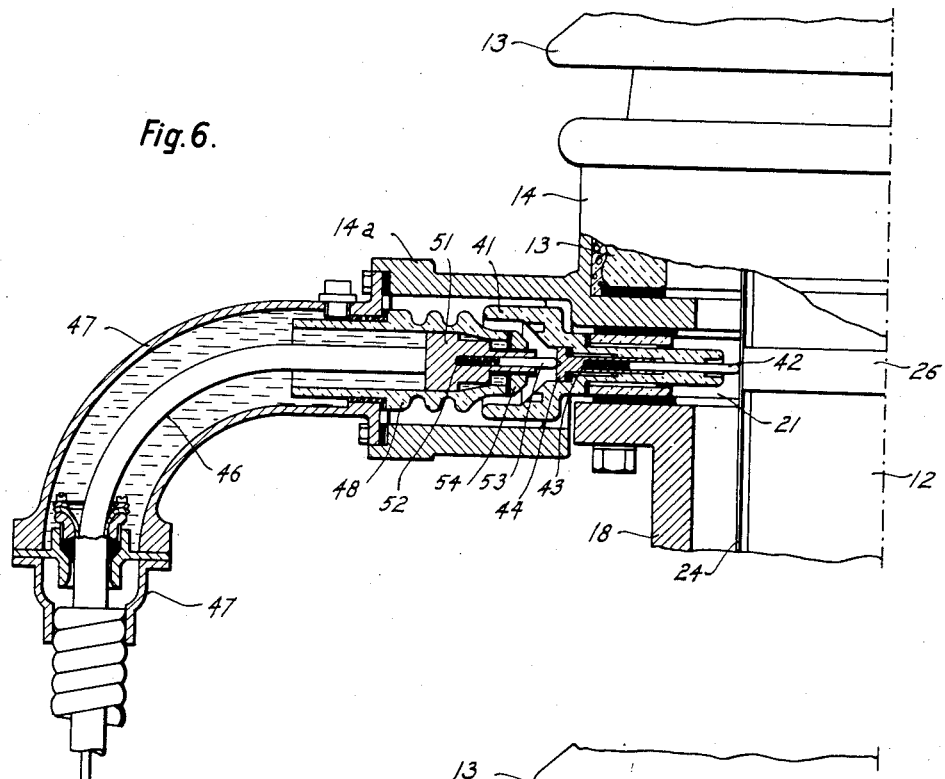
Figure 7:
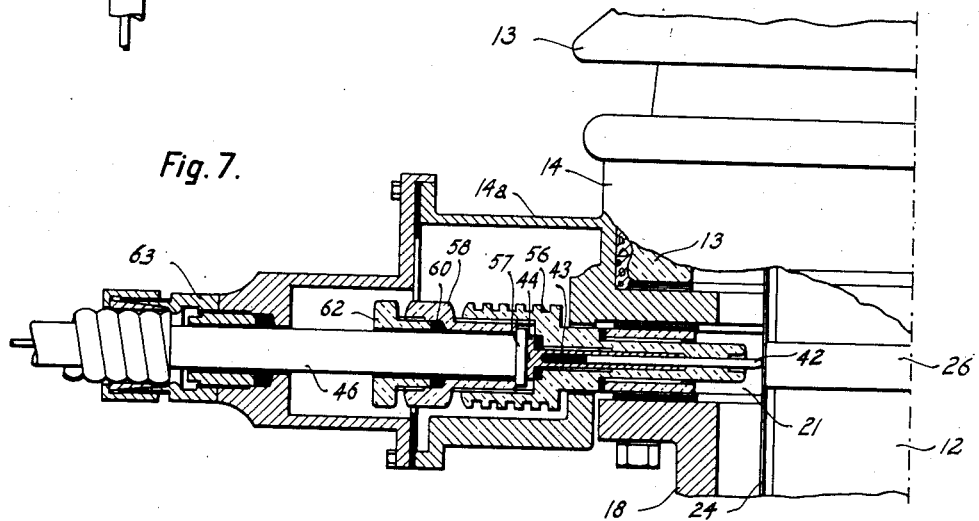
Figure 9:
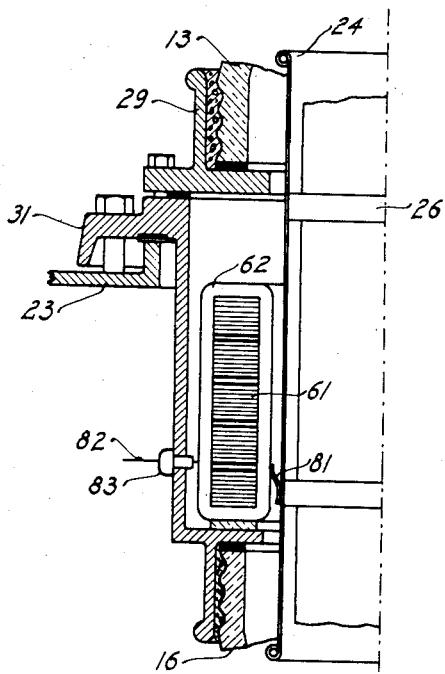
Figure 10:
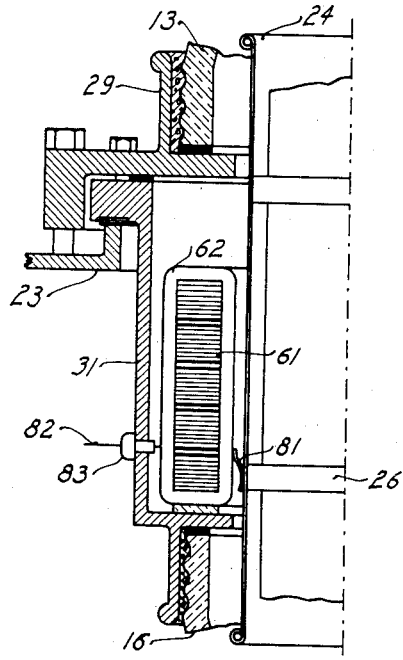
Figure 8:
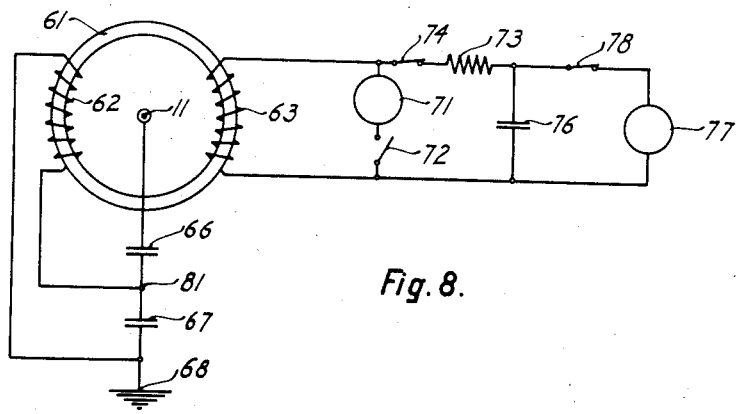

Objects and advantages, other than those above set forth, will be apparent from the following description when read in connection with the accompanying drawings in which Figure 1 illustrates one embodiment of the present invention showing substantially a complete bushing, shown partially in longitudinal section, in which the lower flange for the upper porcelain rests directly on the tank containing the electrical apparatus to be supplied by means of the conductor extending through the bushing, Fig. 2 is a partial longitudinal sectional view of a bushing in which the sleeve carrying the current transformer supports the bushing structure on the tank, Fig. 3 is a partial longitudinal view of a bushing in which the upper porcelain is clamped against the sleeve carrying the current transformer instead of being cemented into a flange as was usual heretofore, Fig. 4 is a partial longitudinal sectional view of a bushing in which the bolts securing the flange holding the upper porcelain against the sleeve carrying the transformer pass entirely through an insulating ring extending between the clamp and the porcelain and the sleeve, Fig. 5 is a partial longitudinal sectional view of a bushing in which the current transformer is mounted in the elongated lower flange of the upper porcelain outside of the tank, Fig. 6 is a longitudinal sectional view of a tap construction by which the potential of a condenser layer is made available for any desired purpose, Fig. 7 is a modification of the structure shown in Fig. 6, Fig. 8 is a diagrammatic illustration of one manner in which a current transformer associated with a high tension bushing may also be used as a step-down transformer to secure a voltage suitable for measuring or synchronizing, and Figs. 9 and 10 are partial sectional views of a bushing structure in which the same core is used for both the current and voltage windings.

Referring more particularly to the drawings by characters of reference, the reference numeral 11 designates a conductor carrying high voltage which conductor is insulated by the several wrappings indicated at 12. The conductor 11 is retained within a bushing comprising an upper porcelain 13 having the form of a hollow truncated cone of relatively great height cemented or otherwise fastened into a retaining flange or cylinder 14 of metal, and a lower porcelain 16 similar in form to the upper porcelain but shorter. The lower porcelain is cemented or otherwise fastened into a retaining metallic flange or a flanged cylinder 17 which is secured, in a suitable manner on a flanged cylinder 18. The cylinder 18 is fastened in a suitable manner, with the interposition of a ring 21, which may preferably be of insulating material, on the flange 14 for the upper porcelain 13 and the open upper end of the upper porcelain 13 is closed by a glass walled oil reservoir and oil gauge 22 which is adapted to keep the entire space within the porcelain and the cylinder 18 about the high tension conductor filled with oil. The entire bushing is supported by the upper porcelain flange 14, on the cover of a tank (not shown) containing electrical apparatus (also not shown) to be connected with the conductor 11.

A condenser layer 24, formed as a cylinder of conductive material is arranged about the conductor 11 exteriorly of the insulation 12 thereon and is retained in spaced relation therefrom by spacer members 26. The ends of the condenser layer 24 are rolled as shown to reduce potential concentration at the ends thereof. To prevent the formation of air pockets between the condenser layer and the insulation 12, the spacing members 26 may have longitudinal grooves or the material forming the condenser layer may be provided with air holes. The rolled ends of the condenser layer are prevented from touching both the insulation 12 and the inner surface of the porcelain insulator to increase the length of the leakage paths to the conductor 11. To further minimize discharges at the ends of the condenser layer 14, these ends may be covered with insulating material. The condenser layer is connected by means of a tap indicated in dotted line at 27; which tap will be shown and described hereinafter in detail, and by which voltage is supplied to a relay, measuring instrument or other suitable device.

A winding 28 is arranged adjacent the cylinder or sleeve 18 on a core of magnetic material and forms the secondary of a current transformer, the primary of which is formed by the conductor 11. The terminals of the transformer secondary 28 are brought out of the tank in any suitable manner now known.

In the embodiment shown in Fig. 2, the flange 14, of Fig. 1, supporting and retaining the upper porcelain 13, is modified as shown at 29 in which modification the upper porcelain is retained in a cylinder 29 having an inwardly extending flange which rests on the insulation ring 21 which is supported by a flange 31 on the sleeve 18 extending over the cover 23 and supporting the entire bushing structure thereon.

In all of the figures, the metallic parts between which the ring 21 is clamped are grounded to the tank 23. The ring 21, therefore, provides a convenient means for connection, in a fluid-tight manner, of a fluid-tight enclosure for an electrical conductor with which the potential tap is connected, as shown in detail in Figs. 6 and 7, and which is connected to the apparatus or instruments at the other end which are to be supplied with current from the potential tap. The potential tap is brought out, therefore, entirely without exposure to the atmosphere which might permit leakage paths. Leakage and change in the output of the potential tap is thereby avoided and the output of the potential tap is not affected by atmospheric conditions.

Fig. 3 illustrates a second modification of the bushing in which the upper porcelain 13 is held on the insulation ring 21 by means of a flanged cylindrical clamp 32 secured in contact with the flange 31 of sleeve 18 by means of bolts 33.

In Fig. 4, a clamp 34 similar to that shown in Fig. 3 is used to retain the upper porcelain 13 on the insulation ring 21 but the clamp 34 is secured by bolts 36 passing through the ring 21 and the clamp rests on the ring rather than directly on the flange 31 of the sleeve 18 as is the case in Fig. 3. It will be seen that the structure shown in Fig. 4 is such that parts of any standard commercial design may be used without requiring modification thereof and that neither the upper nor the lower porcelains need to be pierced at any point. It will likewise be apparent that the structure here shown has many advantages from the viewpoint of assembly during manufacture.

In the embodiment shown in Fig. 5, the upper porcelain 13 is again cemented or otherwise held in a retaining member 36 having a flanged portion 37 formed in a manner similar to that of the sleeve 18 for the purpose of receiving the core and the secondary winding 28 of a current transformer. The secondary winding 28 being now located exteriorly of the tank does not require bushings or outlets of any character about the connections therefrom. The flange 37 is formed with a portion 38 extending partially over the tank cover 23 and resting thereon. The entire weight of the bushing is thus supported on the tank by the member 38.

The means by which a potential is tapped from the condenser layer 24, which means was previously merely indicated at 27, will now be described in detail as it is shown in Fig. 6. A tubular extension 14a is formed at any desired point on the flange 14 and an aperture is pierced through the ring 21. The aperture through the ring 21 is threaded to receive a substantially tubular bushing 41 of insulating material which is itself internally threaded. A contact pin or rod 42 extends through the bushing 41 into contact with the condenser layer 24 and is retained in contact therewith by means of a spring 43 retained within a sleeve 44 threaded into the bushing 41. The contact rod 42 also extends into sleeve 44 for a sufficient distance to cause the sleeve to act as a guide for the rod. The ring 21 and the bushing 41 are sealed in oil-tight engagement with each other and the sleeve 44 is sealed into oil-tight engagement with the bushing 41 by suitable gaskets.

An insulated cable 46, provided with the usual pothead construction as at 47, passes through a connecting bushing 48 and is fastened, by soldering or otherwise, in a sleeve 51 which retains a spring 52 by means of which a contact rod 53 is pressed into engagement with the end of the sleeve 44. The sleeve 51 is made with an outer conical configuration and may be drawn tightly into contact with the inner surfaces of the bushings 48 by means of a nut 54 threadedly engaging the sleeve. A filling compound retained within the pothead 47 is thus prevented from leaking into the space within the extension 14a of the flange.

A modified form of potential tap is shown in Fig. 7 in which a bushing 56 is threaded into the aperture through the ring 21 in fluid-tight relation therewith. The contact rod 42 and the spring 43 are again retained within the sleeve 44 which is threaded into the bushing 56. The cable 46 is provided on the end thereof with a contact disc 57, soldered or otherwise fastened thereon which is adapted to be retained in contact with the end of sleeve 44 by means of a nut 58 of insulating material threaded into the bushing 56. The entrance of fluids between sleeve 44 and contact disc 57 is prevented by a sealing gland comprising packing 60 compressed between the cable 46 and the bushing 56 by means of a packing nut 62 threaded into the bushing. The cable is held in the desired position by a holder 63 which may be of any usual construction. The space within the tubular extension 14a may be filled with oil to increase the insulation of the potential tap. To provide such oil filling it is necessary only to provide a seal where the bushing 56 passes through the flange 14 which will prevent the oil from discharging into the tank 23.

It may be desirable to use the current transformer structure described above as a step-down voltage transformer particularly when the voltage is to be used for measuring or synchronizing purposes. A core 61 is then arranged about the high tension conductor 11 and is provided with a plurality of windings of which winding 62, in conjunction with winding 63, forms a step-down transformer for the voltage of the condenser layer and winding 63, in conjunction with the conductor 11, forms a current transformer. The winding 62 is connected with the condenser layer 24 arranged about the conductor 11 as shown in Figs. 9 and 10. The condenser layer has a capacity 66 to the bushing conductor 11 and a capacity 67 to ground as at 68.

The secondary winding 63 is connected with an ammeter 71 which may be replaced with a relay coil in case relay operations are to be performed. The ammeter may be disconnected by the use of a switch 72, and an inductance 73 and capacity 76, in series with the winding 63, may be connected by a switch 74. A synchroscope or voltmeter 77 may be connected across the capacity 76 by a switch 78. The switches 72 and 74 are preferably interlocked by suitable means with a circuit breaker or disconnecting switch as is well-known.

It will of course be understood that instead of using a single winding as 63 for both the ammeter and synchroscope, separate windings may be used. In case separate windings are used, the ratio of the primary winding 62 to the ammeter winding may be such that an appreciable current is induced by the former in the latter which might result in inaccurate ammeter indications. To prevent such effect, automatically operated means such as an electro-magnetically operated switch may be used instead of the fixed tap 81, to connect the primary winding 62 to the condenser layer. The electro-magnetically operated switch may be so designed as to ground the condensed layer when not connecting the same to the winding 62. The switches controlling the supply of current to the coils of the electro-magnetically operated switch are preferably interlocked with the switches controlling the connection of the ammeter and the synchroscope. It is also possible to prevent the winding 62 from inducing a current in the ammeter winding by providing a separate magnetic core for the ammeter winding and a separate magnetic core for the synchroscope winding and the winding 62. It will of course be understood that the capacitance and the inductances 73 and 76 may be associated with the potential circuit for the synchroscope in a manner other than that shown in Fig. 8, or that additional inductances and capacitances may be connected as may be necessary to secure the most desirable conditions for operation of the synchroscope.

The actual construction of the bushings shown diagrammatically in Fig. 8 may be clearly understood by reference to Figs. 9 and 10. Fig. 9 shows a bushing structure in which the transformer is arranged within the bushing and winding 62 is directly connected with the condenser layer 24 by the tap 81. The low voltage connection 82 is brought out through a simple bushing 83. The insulating ring 21 and the more complicated connection structure shown in the preceding figures (Figs. 6 and 7) will thus be avoided.

The structure shown in Fig. 10 is similar to that shown in Fig. 9 excepting for the flange and tank connection; the upper flange in Fig. 10 forming a hood for the portion of the lower flange supporting the bushing on the tank. The structure and arrangement disclosed in Figs. 8, 9 and 10 provide a bushing structure in which there are no connections exposed to the atmosphere and in which all possible leakage paths between the tap 81 and the winding 62 are avoided; and all the high voltage connections are retained within the oil-filled space of the bushing. Only low voltage connections are brought out through the bushing and the terminals thereof may be located wherever desired. The transformer is completely oil-immersed within the bushing thus simplifying the structure thereof.

Although but a few embodiments of the present invention have been illustrated and described, it will be apparent to those skilled in the art that various changes and modifications may be made therein without departing from the spirit of the invention or from the scope of the appended claims.

The invention claimed is:

1. In a bushing structure for insulated electric conductors at high voltages leading to electrical apparatus within a housing, a condenser layer arranged in spaced relation about the conductor, a metallic flange, a hollow insulator secured within said flange and surrounding the conductor, a second metallic flange, a second hollow insulator secured within the second flange, a metallic cylinder secured to said second flange, and a ring contacting with said cylinder and spacing the same from other portions of the structure.

2. In a bushing structure for insulated electric conductors at high voltages leading to electrical apparatus within a housing, a condenser layer arranged in spaced relation about the conductor, a metallic flange, a hollow insulator secured within said flange and surrounding the conductor, a second metallic flange, a second hollow insulator secured within the second flange, a metallic cylinder secured to said second flange, and a ring contacting with said cylinder and spacing the same from other portions of the structure, the several portions of the structure being so formed and arranged as to avoid leakage paths to the atmosphere exteriorly of the housing.

3. In a bushing structure for insulated electric conductors at high voltages leading to electrical apparatus within a housing, a condenser layer arranged in spaced relation about the conductor, a metallic flange, a hollow insulator secured within said flange and surrounding the conductor, a second metallic flange, a second hollow insulator secured within the second flange, a metallic cylinder secured to said second flange, and a ring contacting with said cylinder and spacing the same from other portions of the structure, and a conductor extending through said ring.

4. In a bushing structure for insulated electric conductors at high voltages leading to electrical apparatus within a housing, a condenser layer arranged in spaced relation about the conductor, a metallic flange, a hollow insulator secured within said flange and surrounding the conductor, a second metallic flange, a second hollow insulator secured within the second flange, a metallic cylinder secured to said second flange, and a ring of insulating material contacting with said cylinder and spacing the same from other portions of the structure, and a conductor extending through said ring into contact with said conductor layer.

5. In a bushing structure for insulated electric conductors at high voltages leading to electrical apparatus within a housing, a condenser layer arranged in spaced relation about the conductor, a metallic flange, a hollow insulator secured within said flange and surroundng the conductor, a second metallic flange, a second hollow insulator secured within the second flange, a metallic cylinder secured to said second flange, and a ring of insulating material resting upon said cylinder and spacing the same from other portions of the structure, said ring being protected from the atmosphere externally of the housing by the first-said flange to avoid leakage paths to the atmosphere.

6. In a bushing structure for insulated electric conductors at high voltages leading to electrical apparatus within a housing, a condenser layer arranged in spaced relation about the conductor, a metallic flange, a hollow insulator secured within said flange and surrounding the conductor, a second metallic flange, a second hollow insulator secured within the second flange, a metallic cylinder secured to said second flange, and a ring of insulating material resting upon said cylinder and spacing the same from other portions of the structure, a conductor extending through said ring, and an insulating bushing arranged about said conductor and extending through said ring, said bushing being arranged in fluid-tight relation with said conductor and said ring.

7. In a bushing structure for insulated electric conductors at high voltages leading to electrical apparatus within a housing, a condenser layer arranged in spaced relation about the conductor, a metallic flange, a hollow insulator secured within said flange and surrounding the conductor, a second metallic flange, a second hollow insulator secured within the second flange, a metallic cylinder secured to said second flange, and a ring of insulating material resting upon said cylinder and spacing the same from other portions of the structure, a conductor extending through said ring, and an insulating bushing arranged about said conductor and extending through said ring, said bushing being arranged in fluid-tight relation with said conductor and said ring, the first-said flange being formed to enclose said bushing from the atmosphere exteriorly of the housing.

8. In a bushing structure for insulated electric conductors at high voltages leading to electrical apparatus within a housing, a condenser layer arranged in spaced relation about the conductor, a metallic flange, a hollow insulator secured within said flange and surrounding the conductor, a second metallic flange, a second hollow insulator secured within the second flange, a metallic cylinder secured to said second flange, a ring of insulating material contacting with said cylinder and spacing the same from other portions of the structure, a transformer core and secondary windings arranged adjacent the conductor, a conductor extending through said ring into contact with said condenser layer, and conductors from the exterior of the housing connected with said current transformer winding.

9. In a bushing structure for insulated electric conductors at high voltages leading to electrical apparatus within a housing, a condenser layer arranged in spaced relation about the conductor, a metallic flange, a hollow insulator secured within said flange and surrounding the conductor, a second metallic flange, a second hollow insulator secured within the second flange, a metallic cylinder secured to said second flange, and a ring of insulating material resting upon said cylinder and spacing the same from other portions of the structure, a conductor extending through said ring, and an insulating bushing arranged about said conductor and extending through said ring, said bushing comprising a tubular member of insulating material, a sleeve extending into said tubular member, a rod extending through said tubular member and into said sleeve, and a spring within said sleeve to force said rod into contact with said condenser layer.

10. In a bushing structure for insulated electric conductors at high voltages leading to electrical apparatus within a housing, a condenser layer arranged in spaced relation about the conductor, a metallic flange, a hollow insulator secured within said flange and surrounding the conductor, a second metallic flange, a second hollow insulator secured within the second flange, a metallic cylinder secured to said second flange, and a ring of insulating material resting upon said cylinder and spacing the same from other portions of the structure, and a conductor extending through said ring, and an insulating bushing arranged about said conductor and extending through said ring, said bushing comprising a tubular member of insulating material, said tubular member being threaded into said ring, a gasket interposed between said tubular member and said ring, a sleeve extending into said tubular member, said sleeve being threaded into said tubular member, a gasket interposed between said sleeve and said tubular member, said gaskets sealing said bushing in fluid-tight relation with said ring, a rod extending through said tubular member and into said sleeve, and a spring within said sleeve to force said rod into contact with said condenser layer.

In testimony whereof I have hereunto subscribed my name this 22d day of May, A. D. 1931.

OTTO NAEF.